(12) United States Patent
Debailleul

(10) Patent No.: US 8,165,795 B2
(45) Date of Patent: Apr. 24, 2012

(54) HYBRID INERTIAL NAVIGATION SYSTEM BASED ON A KINEMATIC MODEL

(75) Inventor: Frédéric Debailleul, Le Chesnay (FR)

(73) Assignee: Sagem Defense Securite, Paris (FR)

( * ) Notice: Subject to any disclaimer, the term of this patent is extended or adjusted under 35 U.S.C. 154(b) by 1006 days.

(21) Appl. No.: 11/792,403

(22) PCT Filed: Dec. 7, 2005

(86) PCT No.: PCT/EP2005/056578
§ 371 (c)(1),
(2), (4) Date: Jun. 5, 2007

(87) PCT Pub. No.: WO2006/061403
PCT Pub. Date: Jun. 15, 2006

(65) Prior Publication Data
US 2008/0221794 A1 Sep. 11, 2008

(30) Foreign Application Priority Data
Dec. 7, 2004 (FR) ..................... 04 13040

(51) Int. Cl.
*G01C 21/06* (2006.01)
*G01C 21/12* (2006.01)
*G01C 21/24* (2006.01)

(52) U.S. Cl. .................. 701/220; 244/3.2; 244/195

(58) Field of Classification Search .......... 701/220–221, 701/205; 342/357.14; 244/3.2, 79, 164
See application file for complete search history.

(56) References Cited

U.S. PATENT DOCUMENTS

| | | | | |
|---|---|---|---|---|
| 2,984,435 A * | 5/1961 | Faith et al. | ..................... | 244/3.2 |
| 3,058,697 A * | 10/1962 | Tribken | ......................... | 244/197 |
| 3,301,508 A * | 1/1967 | Yamron | ...................... | 244/3.18 |
| 3,439,427 A * | 4/1969 | Gow | .............................. | 33/268 |
| 3,680,355 A * | 8/1972 | Goldstein et al. | ............. | 73/1.77 |
| 3,693,909 A * | 9/1972 | Hall | ............................... | 244/3.2 |
| 3,702,477 A * | 11/1972 | Brown | ......................... | 342/451 |
| 4,144,571 A * | 3/1979 | Webber | ....................... | 701/217 |
| 4,168,524 A * | 9/1979 | Soltz et al. | .................... | 701/223 |
| 4,320,287 A * | 3/1982 | Rawicz | ........................ | 235/412 |
| 4,321,678 A * | 3/1982 | Krogmann | .................. | 701/220 |
| 4,347,573 A * | 8/1982 | Friedland | ..................... | 701/220 |
| 4,351,027 A * | 9/1982 | Gay et al. | ..................... | 701/116 |
| 4,608,641 A * | 8/1986 | Snell | ............................... | 701/4 |
| 4,830,311 A * | 5/1989 | Pritchard et al. | ............ | 244/3.15 |

(Continued)

*Primary Examiner* — Mark Hellner
*Assistant Examiner* — Ari M Diacou
(74) *Attorney, Agent, or Firm* — Blakely, Sokoloff, Taylor & Zafman

(57) ABSTRACT

The invention concerns a method for improving determination of inertial navigation parameters (1) of a carrier (1) moving along modelizable kinematic movement components, the method including the following steps: (a) selecting, taking into account a kinematic model (13) of the carrier (1), at least one movement component whereby integration (11) of the inertial measurements (20) is assumed to give a predetermined value, (b) integrating (11) the inertial measurements (20) in accordance with the selected component(s), (c) determining (14) based on the component(s) a variation between the integration (11) obtained at step (b) and the predetermined value of step (a), (d) estimating on the basis of the variation(s) thus obtained a global inertial error resulting from internal errors associated with said modelizable components, and values to be updated of variable parameters of the kinematic model (13), (e) correcting said inertial navigation based on the thus determined global inertial error. The invention also concerns an inertial navigation system for implementing said method.

9 Claims, 11 Drawing Sheets

U.S. PATENT DOCUMENTS

Figure 1:
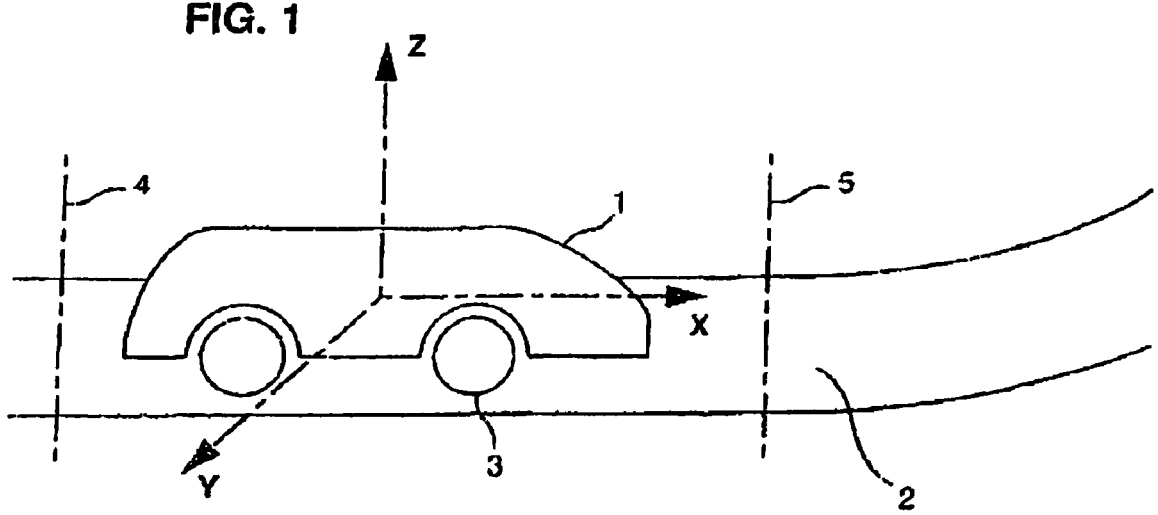

| | | | |
|---|---|---|---|
| 5,001,647 A * | 3/1991 | Rapiejko et al. | 701/220 |
| 5,050,086 A * | 9/1991 | Lambregts | 701/4 |
| 5,184,304 A * | 2/1993 | Huddle | 701/220 |
| 5,339,684 A * | 8/1994 | Jircitano et al. | 73/178 R |
| 5,355,316 A * | 10/1994 | Knobbe | 701/220 |
| 5,410,478 A * | 4/1995 | Richard et al. | 701/1 |
| 5,410,487 A * | 4/1995 | Okayama et al. | 701/220 |
| 5,526,263 A * | 6/1996 | Tanaka et al. | 701/70 |
| 5,574,650 A * | 11/1996 | Diesel | 701/220 |
| 5,736,923 A * | 4/1998 | Saab | 340/429 |
| 5,790,405 A * | 8/1998 | Buchler | 701/21 |
| 5,948,045 A * | 9/1999 | Reiner | 701/220 |
| 6,024,655 A * | 2/2000 | Coffee | 473/407 |
| 6,163,021 A * | 12/2000 | Mickelson | 244/3.2 |
| 6,170,344 B1 * | 1/2001 | Ignagni | 73/865.8 |
| 6,273,370 B1 * | 8/2001 | Colgren | 244/181 |
| 6,282,496 B1 * | 8/2001 | Chowdhary | 701/220 |
| 6,374,184 B1 * | 4/2002 | Zahm et al. | 701/213 |
| 6,424,915 B1 * | 7/2002 | Fukuda et al. | 701/214 |
| 6,445,983 B1 * | 9/2002 | Dickson et al. | 701/23 |
| 6,459,990 B1 * | 10/2002 | McCall et al. | 701/220 |
| 6,477,465 B1 * | 11/2002 | McCall et al. | 701/220 |
| 6,532,419 B1 * | 3/2003 | Begin et al. | 701/220 |
| 6,564,148 B2 * | 5/2003 | Morgan et al. | 701/220 |
| 6,594,617 B2 * | 7/2003 | Scherzinger | 702/160 |
| 6,647,352 B1 * | 11/2003 | Horton | 702/151 |
| 6,782,742 B1 * | 8/2004 | Adebjork et al. | 73/170.01 |
| 6,868,921 B2 * | 3/2005 | Burrows et al. | 175/26 |
| 6,914,931 B2 * | 7/2005 | Douglas et al. | 375/147 |
| 7,509,216 B2 * | 3/2009 | Huddle | 701/221 |
| 7,613,567 B2 * | 11/2009 | Hashiba | 701/220 |
| 2002/0029110 A1 * | 3/2002 | Fukuda et al. | 701/213 |
| 2002/0049519 A1 * | 4/2002 | Ben-Jaacov et al. | 701/3 |
| 2002/0156579 A1 * | 10/2002 | Morgan et al. | 701/220 |
| 2003/0033105 A1 * | 2/2003 | Yutkowitz | 702/105 |
| 2003/0216864 A1 * | 11/2003 | Fukuda et al. | 701/216 |
| 2003/0236604 A1 * | 12/2003 | Lu et al. | 701/45 |
| 2004/0155142 A1 * | 8/2004 | Muravez | 244/3.11 |
| 2004/0176882 A1 * | 9/2004 | Fukuda et al. | 701/4 |
| 2005/0149240 A1 * | 7/2005 | Tseng et al. | 701/38 |
| 2005/0203701 A1 * | 9/2005 | Scherzinger | 701/207 |
| 2005/0240347 A1 * | 10/2005 | Yang | 701/220 |
| 2007/0005212 A1 * | 1/2007 | Xu et al. | 701/70 |
| 2011/0054729 A1 * | 3/2011 | Whitehead et al. | 701/29 |

* cited by examiner

HYBRID INERTIAL NAVIGATION SYSTEM BASED ON A KINEMATIC MODEL

This is a non-provisional application claiming the benefit of International application number PCT/EP2005/056578 filed Dec. 7, 2005.

In general, this present invention concerns inertial navigation systems (INS) mounted in a carrier.

More precisely, the invention concerns a method intended for determining the inertial navigation parameters of a carrier moving along with modelizable kinematic movement components, the method including a step of inertial measurement which can include an error, called the inertial error, which results in determining these parameter inaccurately.

Methods of this type are already known.

They are used in particular in order to obtain a position of the carrier in which the inertial navigation system is installed.

In this regard, these systems currently enable performance levels to be achieved that are satisfactory in terms of precision.

For example, it is possible to achieve a position accuracy by pure inertia of the order of 1 Nm/h. However, in order to achieve greater accuracy (decametric or metric for example), then external data is used.

To this end, we begin by making the inertial measurements in order to estimate a position of the carrier, and then, in order to correct any errors in this estimate, we use the said external information, the latter being supplied by another system.

Such navigation systems are thus usually referred to as "hybrid systems".

By way of an example, we are familiar with systems of this type in which the said correction is achieved by means of data coming from a Global Positioning System (GPS), representing the external information.

One advantage here is that this external information provides the coordinates of the carrier directly in a predetermined coordinate system.

However, a known problem is that the global positioning systems are not invulnerable to possible jamming attacks.

In this case, the inertial navigation system can no longer depend upon the GPS data in order to return it to the correct position.

Moreover, it can happen that access to the GPS data is rendered difficult in certain zones on the trajectory of the carrier.

And again, the inertial system is no longer in possession of means in order to return it to the correct position, or in other words to correct the positioning errors that have accumulated over time at the level of the inertial sensors.

The performance of the navigation system using the GPS is then limited to the performance achieved by pure inertia, which remains a handicap.

Naturally however, we are familiar with solution that can be used to overcome this drawback.

For example, in the case of a carrier of the motor vehicle type, the external information can be obtained from an odometer to which it is connected.

We then use the reliable measurement of the distance covered by the vehicle in order to correct the positions deduced from the inertial measurements.

Although a system of this type responds to some extent to the problems arising, in particular for motor vehicles, it still remains that its integration is not entirely without certain difficulties.

Firstly, the adaptation of the system to the vehicle frequently gives rise to problems, in particular regarding good reception of the signal sent by the odometer. For example, good-quality reception requires considerable design efforts at the level of the electronic circuits, given the wide variation of wave shape that these signals can have.

Secondly, due to environmental constraints (deformation of the terrain, uphill, downhill, etc.), the carrier is forced to change direction in space.

For example, if we consider a movement component parallel to the direction of travel of the vehicle, the latter can vary according to this component (suspension movement, etc.), and this reduces the relevance of comparing the odometric measurements with the built-in inertial measurements.

There therefore exist other solutions which are used to achieve good positioning performance in the absence of a global positioning system or an odometer.

For example, another solution, already known by the acronym "ZUPT" (Zero Update), consists of periodically stopping the carrier so that the speeds along the axes in space become zero, and then using this information.

This solution is often described as "zero-speed hybridisation".

By choosing this solution, the inertial navigation system is capable of estimating the errors induced by the sensors and of thus improving performance, regarding positioning in particular.

There are nevertheless limits to such a solution.

Typically, these periodic stops (every 4 to 10 minutes according to the performance desired) sometimes impose severe constraints.

For example, in the case of a military carrier in a tank or helicopter or other fighting machine, it can inconvenient to stop in order to execute a zero-speed hybridisation.

We know about an inertial navigation system in a carrier which is able, to some extent, to dispense with external data [2].

To this end, the system implements a method which reduces the inertia errors of the unit.

More precisely, the method includes a step in which we choose two speed components along the transverse and vertical axes of the vehicle.

These components are assumed to be zero and are used as observations from a Kalman filter.

One problem of this method is that it offers better performance in terms of precision only in particular travelling conditions (a constant carrier speed and flat terrain in particular).

Thus, by way of a non-limiting example, the method is no longer precise from the moment when the carrier veers, climbs and/or descends.

One aim of this present invention is to circumvent, to some extent, the drawbacks presented above.

In particular, one aim of this present invention is the ability to achieve performance in terms of positioning that is much better than by pure inertia, regardless of the environment conditions, such as the movement conditions.

In order to achieve this objective, this present invention proposes a method that is intended for determining the inertial navigation parameters of a carrier moving along with modelizable kinematic movement components, the method including a step of inertial measurement which can include an error, known as the inertia error, which results in determining these parameters inaccurately, the method being characterised in that it includes the following steps:

(a) given that one has a kinematic model of the carrier, choosing at least one movement component according to which the integration of the inertial measurements is assumed to give a predetermined value, (b) integrating measurements according to the chosen component or components, (c) in accordance with these components, determining a difference between the integration effected at step (b) and the predetermined value of step (a), (d) as a function of the differences thus obtained, estimating an overall inertial error resulting from the inertia errors associated with the said modelizable components, and of the values of the variable parameters of the kinematic model that are to be updated (13), (e) correction of the said inertial navigation parameters as a function of the overall inertia error thus determined.

Preferred but not limiting aspects of the method according to the invention are as follows:
the estimates in step (d) are made by means of a filter;
the filter is a Kalman filter;
one of the variable parameters of the kinematic model is an angle $\alpha$ between at least one axis of the carrier and one axis of a road traveled by this carrier;
the angle $\alpha$ is modeled as a function of at least one parameter, reflecting an operational state of the carrier;
one of the variable parameters of the kinematic model is a distance coordinate between the axes of the road and that of the carrier.

In addition, the invention proposes an inertial navigation system mounted in a carrier moving along with modelizable kinematic movement components that include:
inertial measurement means,
means designed to choose, on a kinematic model of the carrier, at least one movement component according to which integration of the inertial measurements is assumed to give a predetermined value,
means designed to integrate measurements according to the chosen component or components,
means designed to determine, in accordance with the said components, a difference between the integration and the predetermined value,
means designed to estimate, as a function of the difference or differences thus obtained, an overall inertia error resulting from the inertia errors associated with the said modelizable components,
means designed to correct the said inertial is navigation parameters as a function of the overall inertia error determined,
characterised in that it also includes means designed to estimate, in accordance with the said difference, values of the variable parameters of the kinematic model that are to be updated (13).

The system according to the invention is also capable of implementing the method presented above according to one of its preferred aspects, either alone or in combination.

Thus in this present invention, it is possible advantageously to circumvent the need for external information.

The additional information that is useful for correction of the inertia errors is internal information that is cleverly generated by a kinematic model, that is a model of the behaviour of the carrier particularly in terms of movements as a function of the chosen components.

Figure 2:
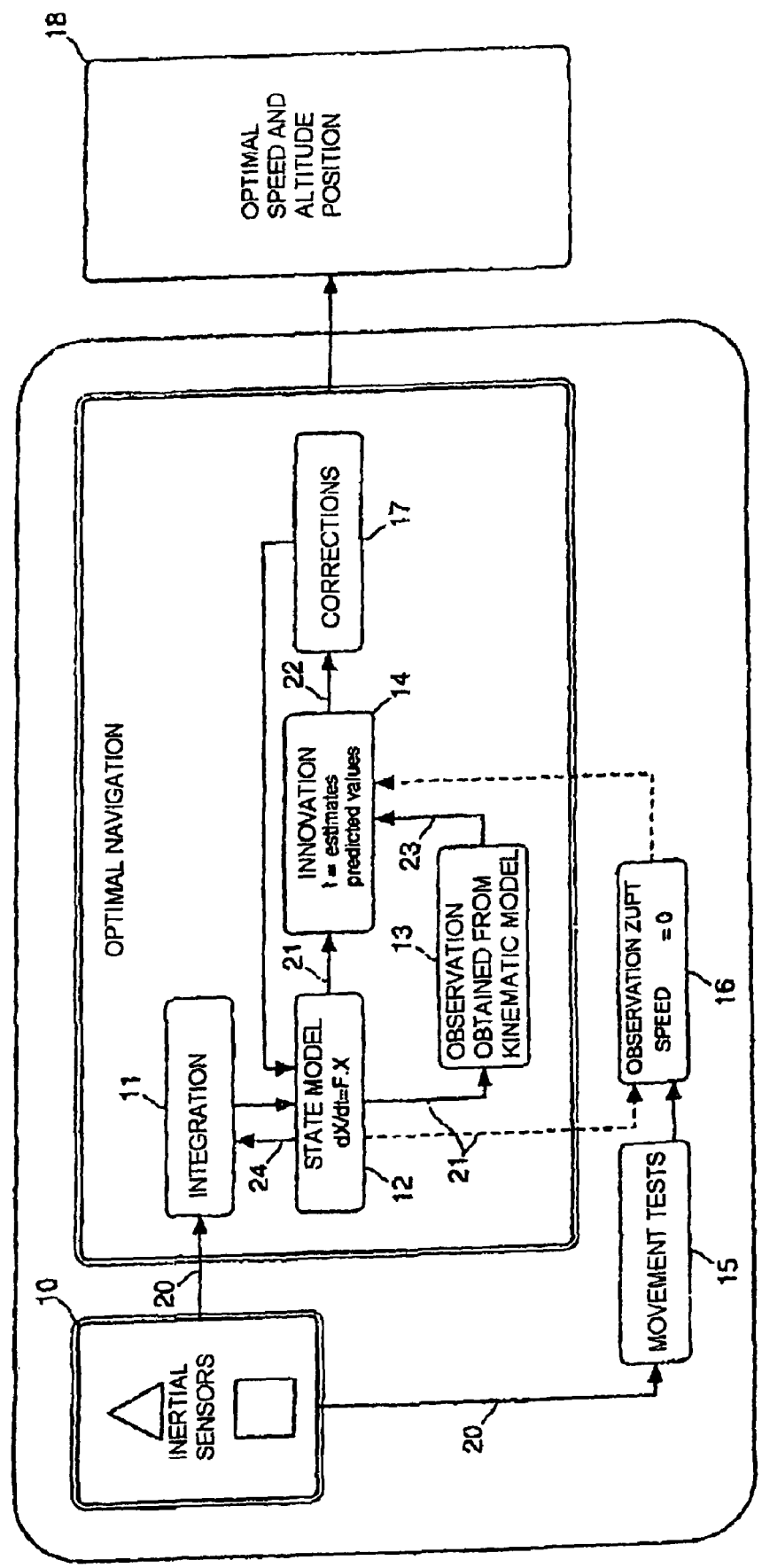
Figure 3:
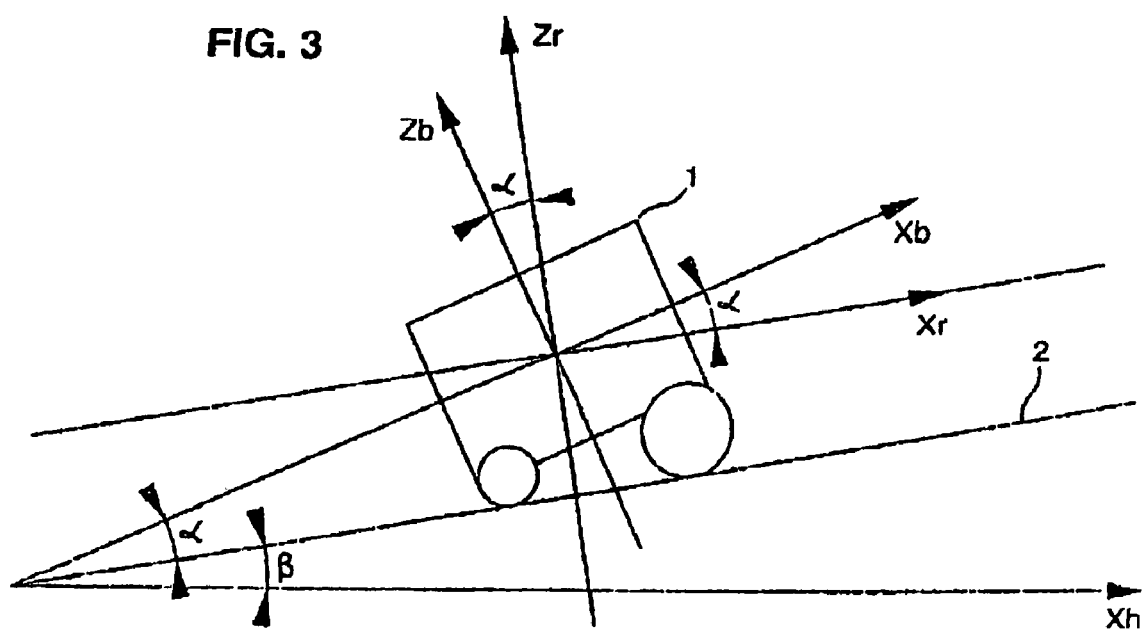
Figure 4:
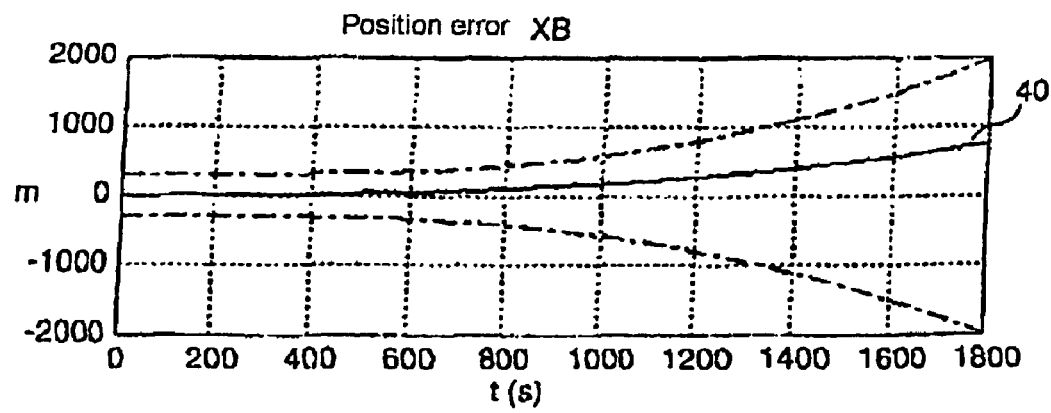
Figure 5:
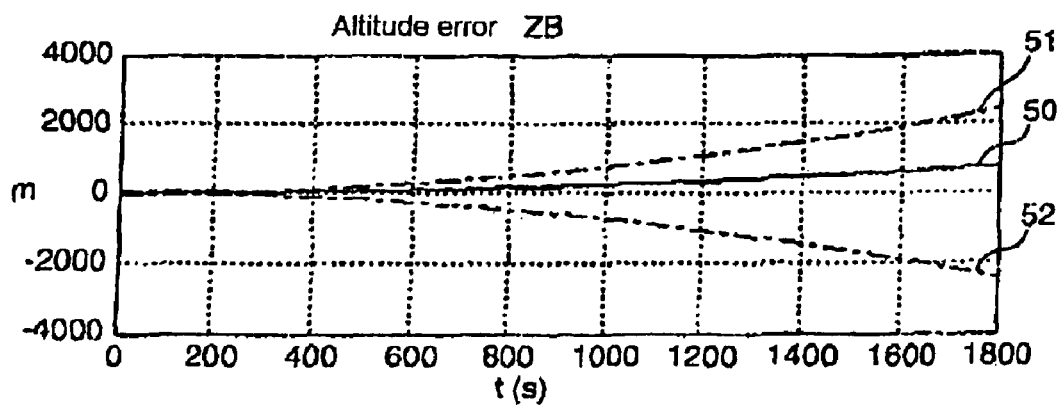
Figure 6:
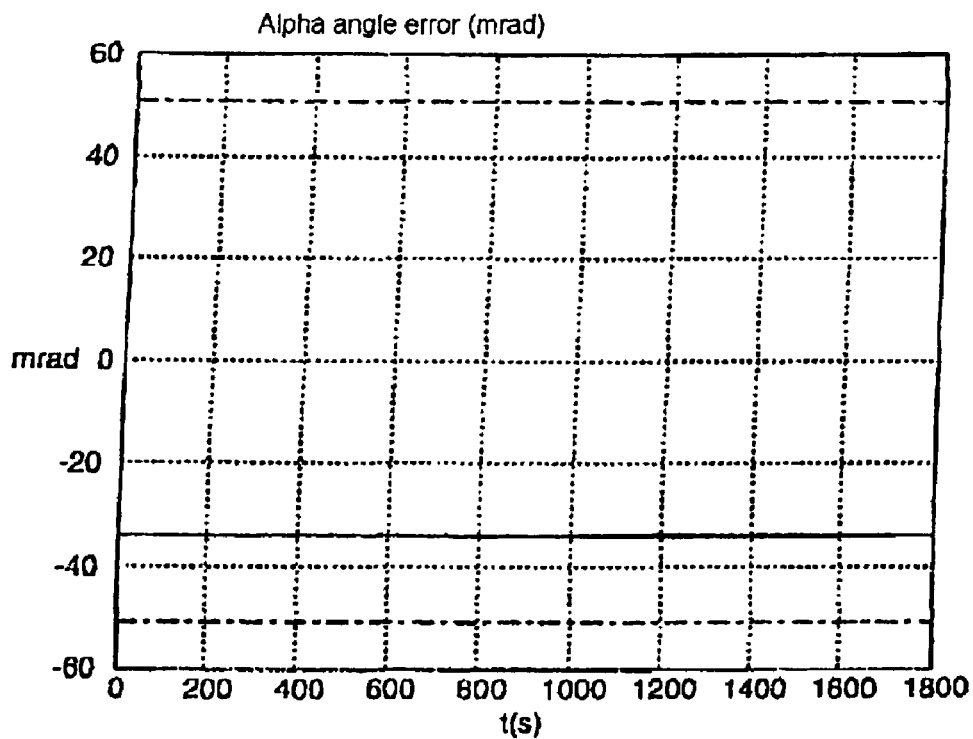
Figure 7:
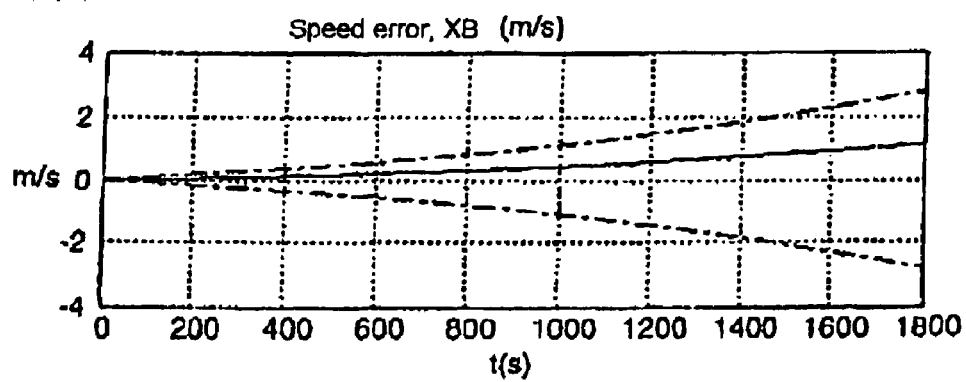
Figure 8:
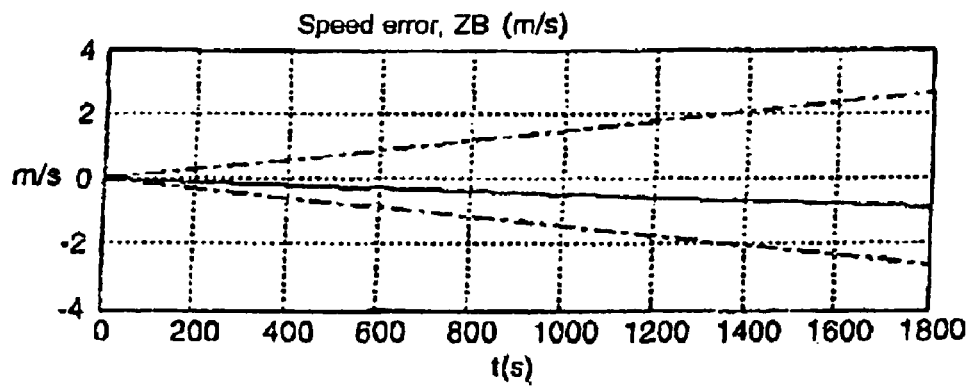
Figure 9:
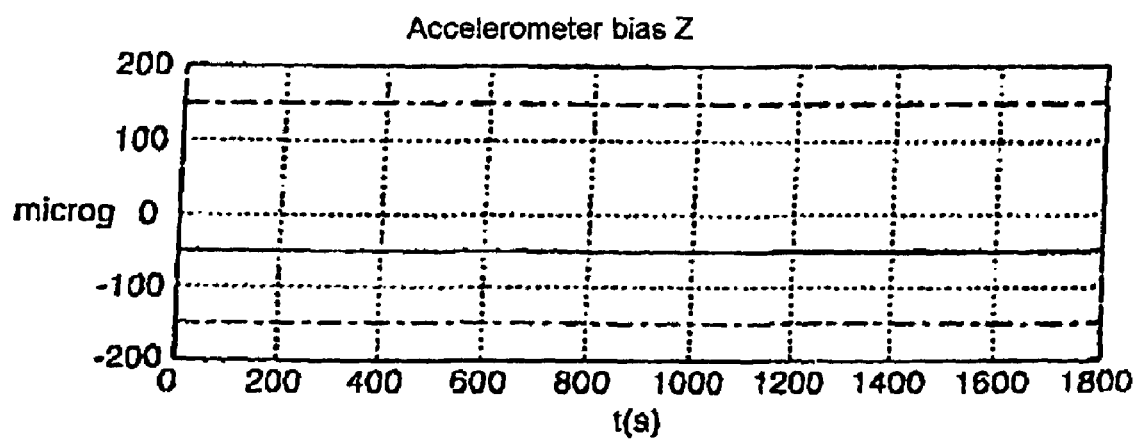
Figure 10:
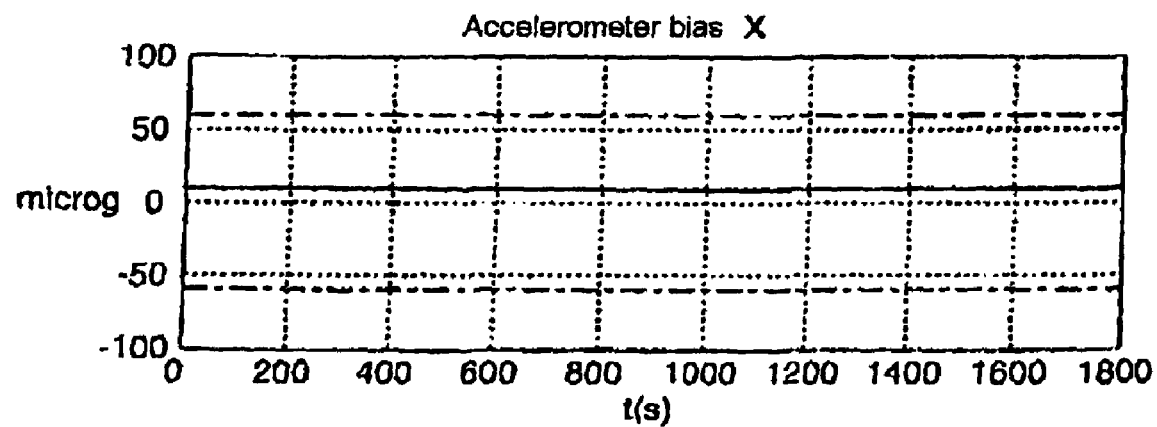
Figure 11:
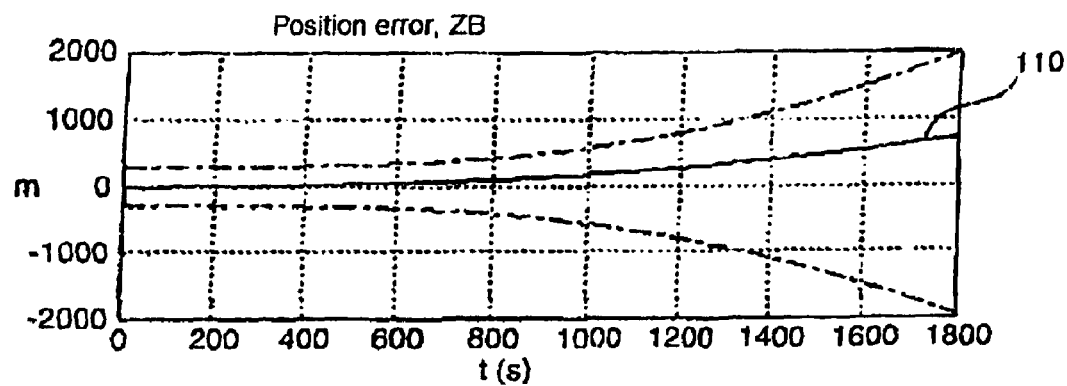
Figure 12:
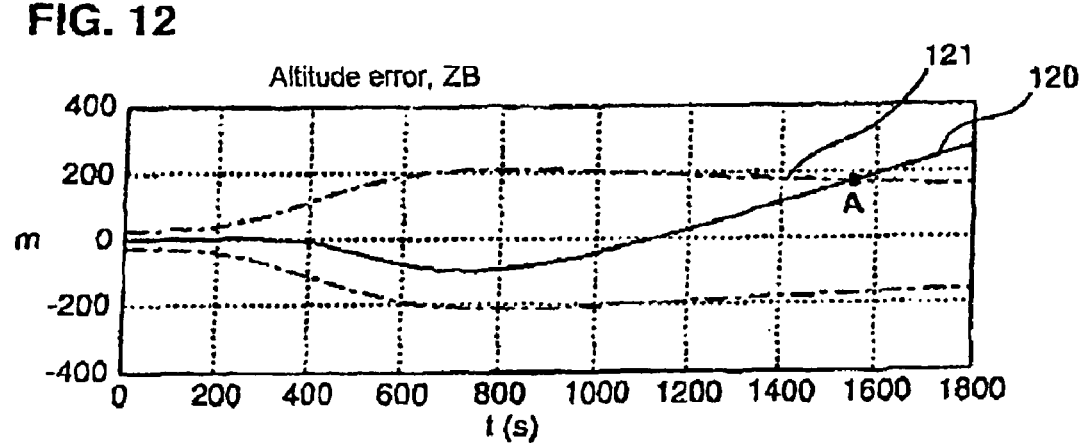
Figure 13:
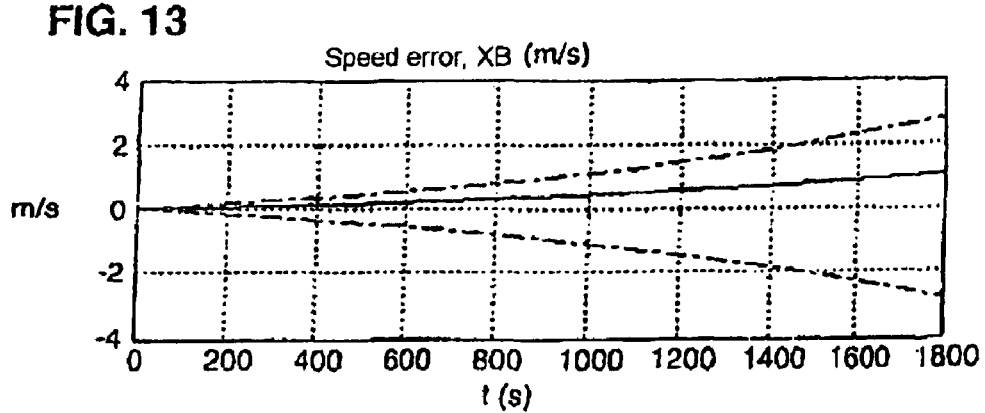
Figure 14:
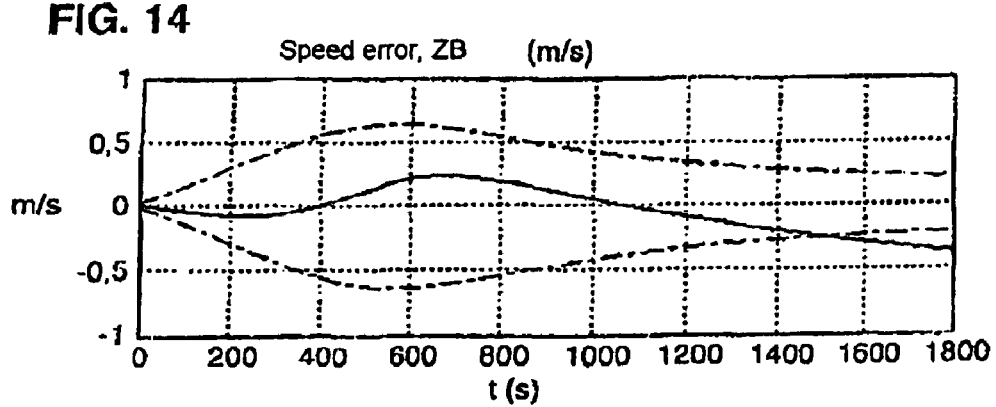
Figure 15:
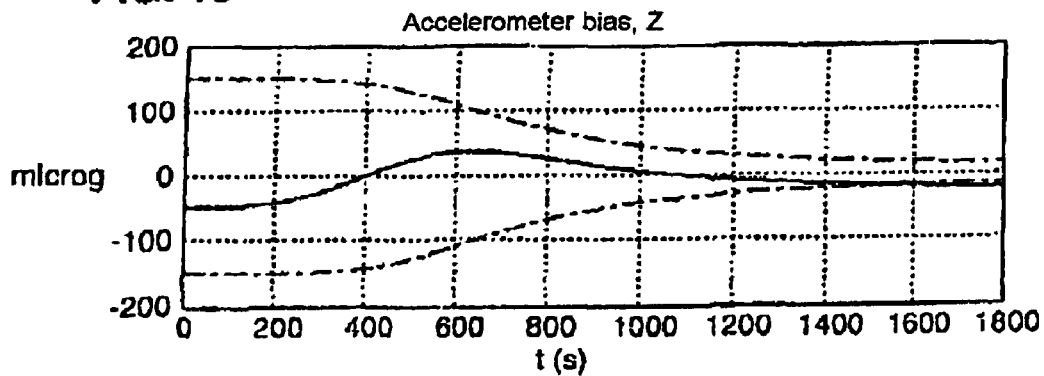
Figure 16:
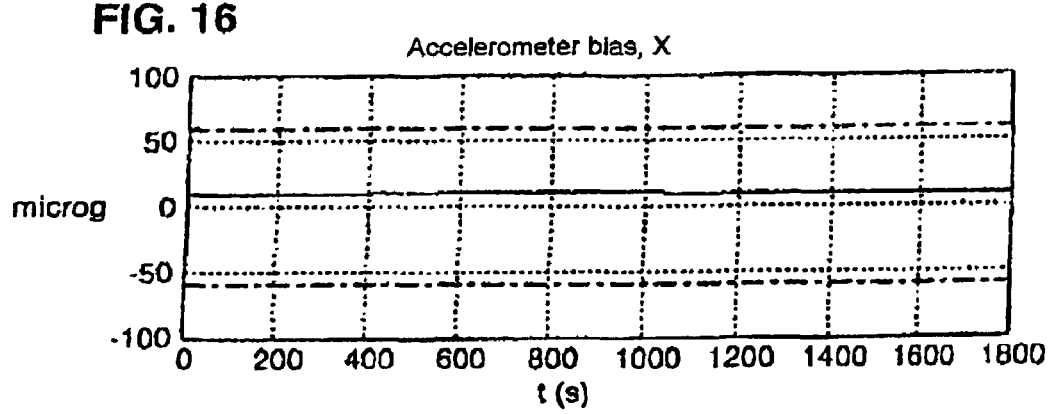
Figure 17:
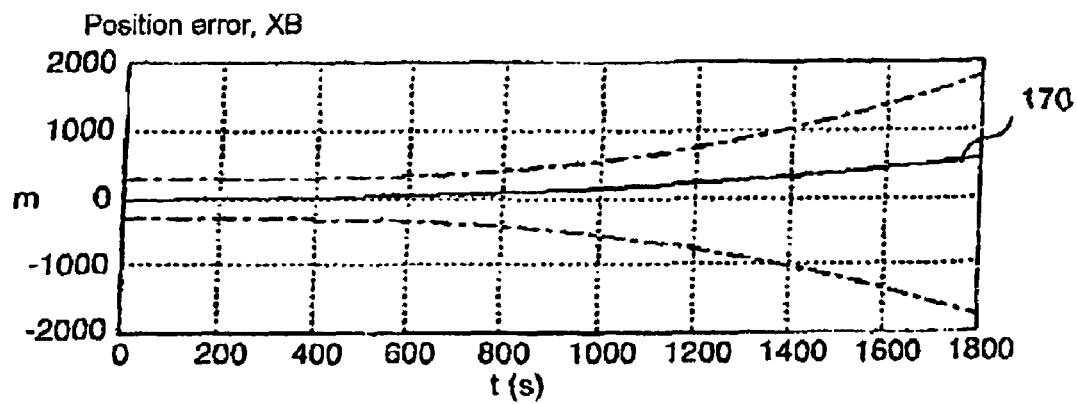
Figure 18:
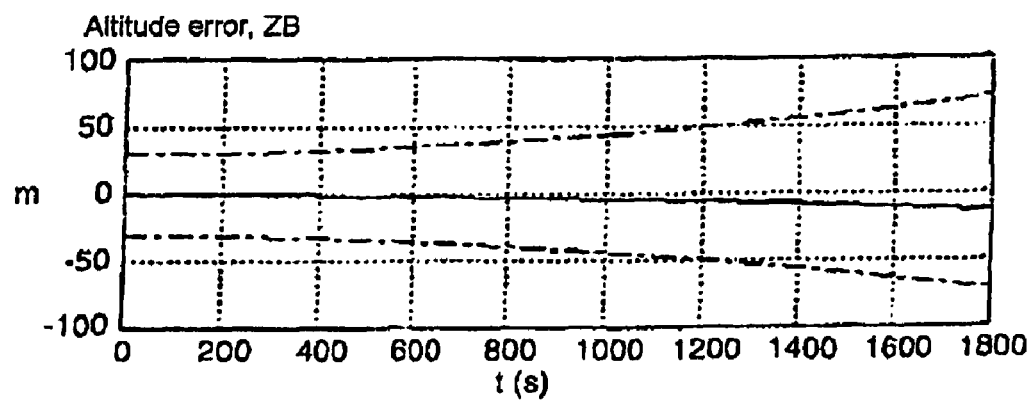
Figure 19:
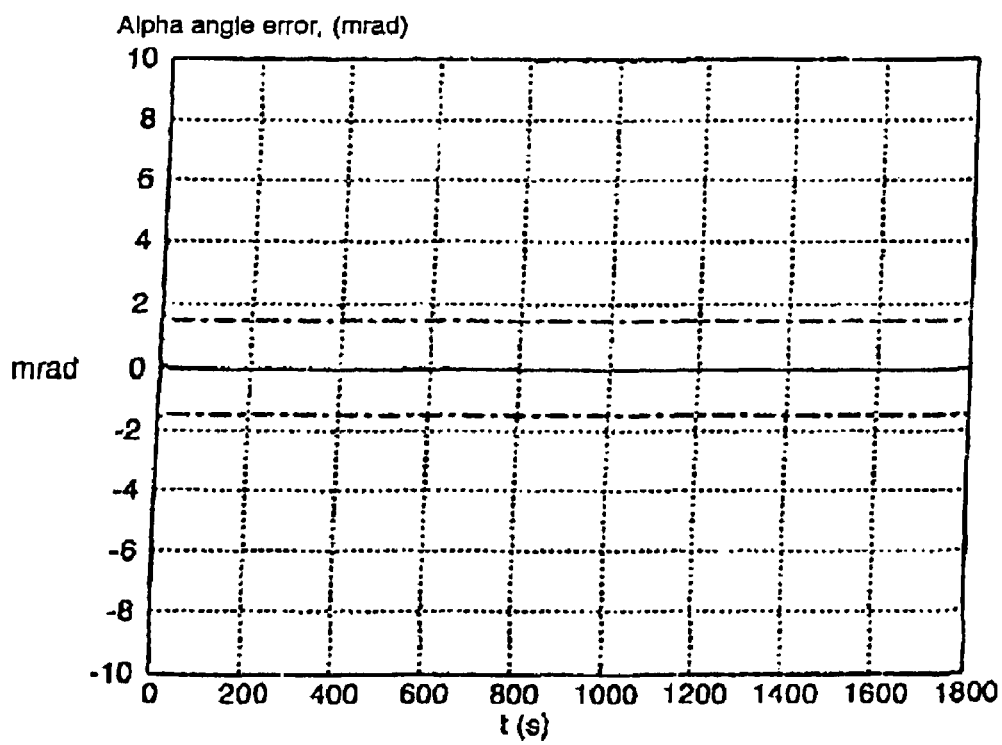
Figure 20:
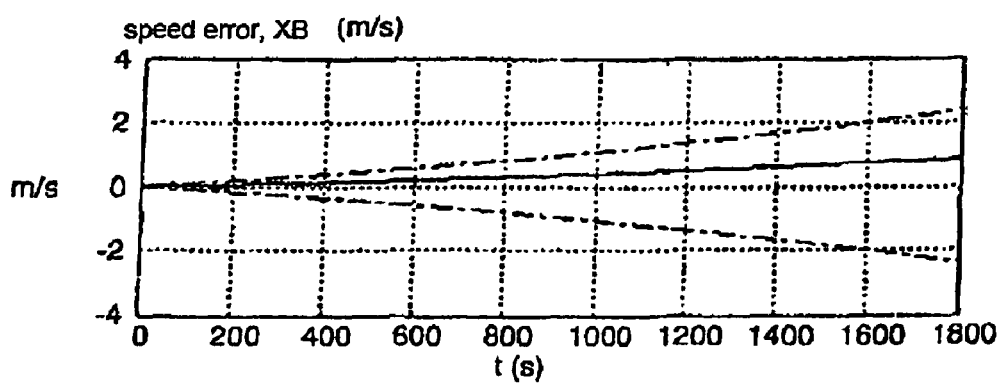
Figure 21:
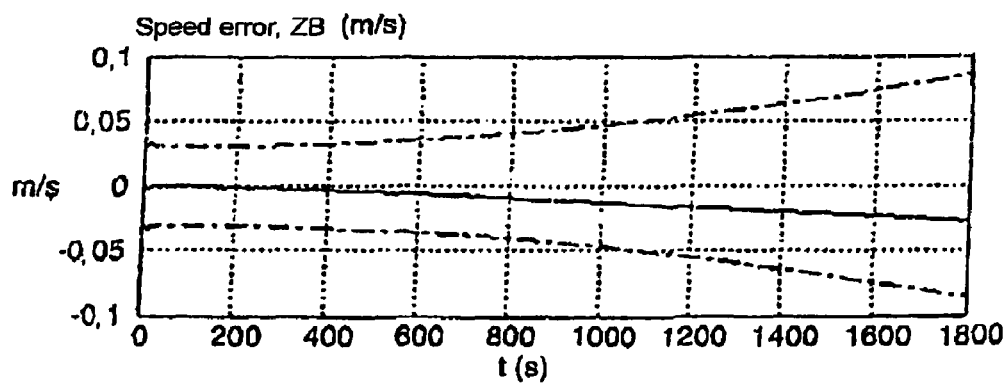
Figure 22:
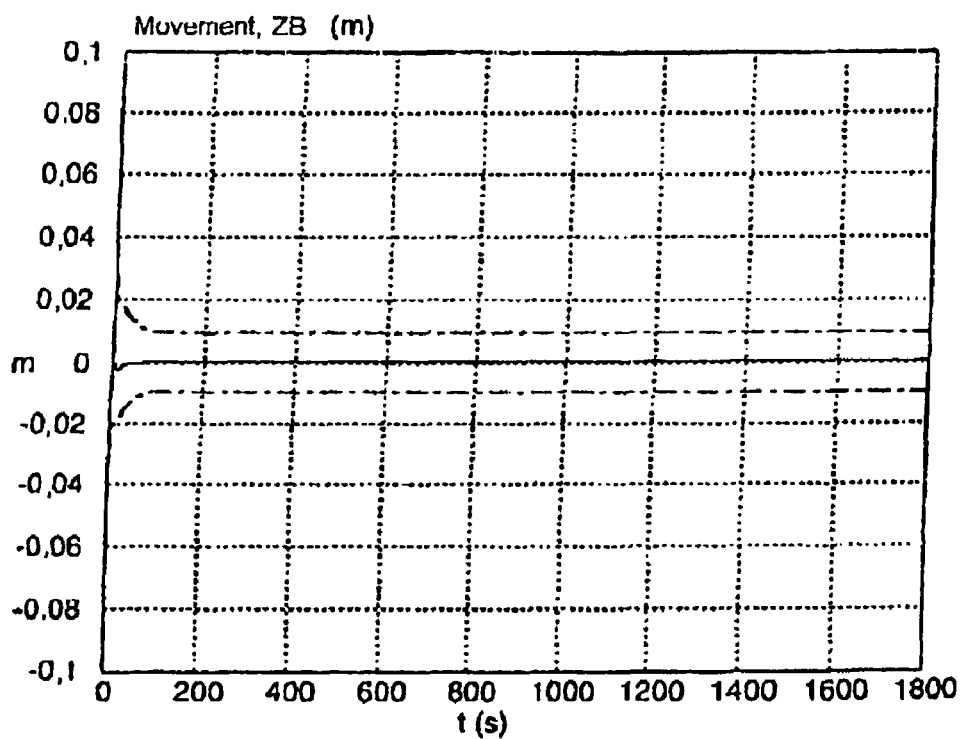
Figure 23:
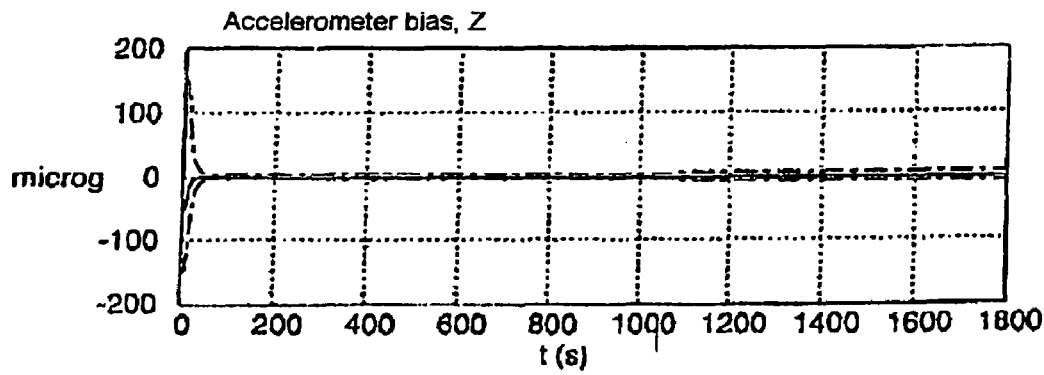
Figure 24:
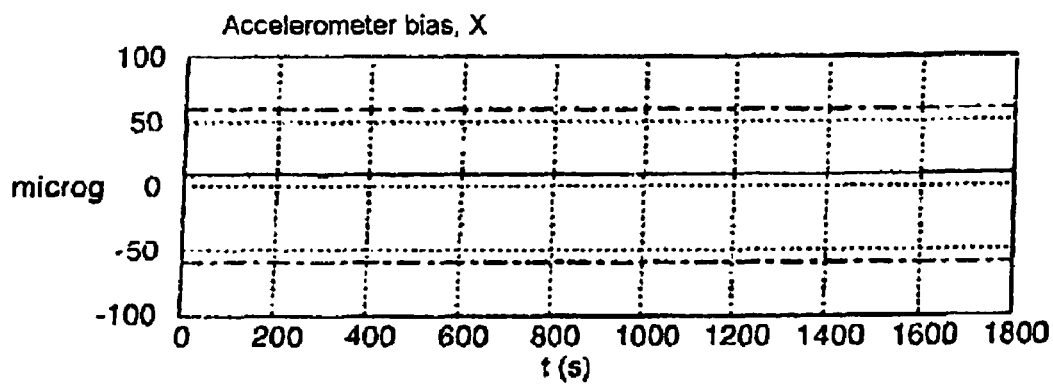

Other aspects, aims and advantages of the invention will appear more clearly on reading the following description, which is provided with reference to the appended drawings in which:

FIG. 1 represents a carrier in a three-dimensional coordinate system that is moving in a straight line on a horizontal road, FIG. 2 schematically represents the operation of a navigation system according to the invention, FIG. 3 represents a carrier, such as a vehicle, that is moving in a straight line on an inclined road, FIG. 4 shows, as a function of time, a position error along an axis Xb, achieved by simulating an integration by pure inertia of the type from prior art that does not effect a correction, where the studied system is that of FIG. 3, FIG. 5 shows, as a function of time, an altitude error along an axis Zb, achieved by simulating an integration by pure inertia of the type from prior art that does not effect a correction, where the studied system is that of FIG. 3, FIG. 6 shows, as a function of time, an error in an angle $\alpha$ achieved by simulating an integration by pure inertia of the type from prior art that does not effect a correction, where the studied system is that of FIG. 3, FIG. 7 shows, as a function of time, a speed error along axis Xb, achieved by simulating an integration by pure inertia of the type from prior art that does not effect a correction, where the studied system is that of FIG. 3, FIG. 8 shows, as a function of time, a speed error along axis Zb achieved by simulating an integration by pure inertia of the type from prior art that does not effect a correction, of the studied system corresponding to that of FIG. 3, FIG. 9 shows, as a function of time, an accelerometer bias error Z achieved by simulating an integration by pure inertia of the type from prior art that does not effect a correction, where the studied system is that of FIG. 3, FIG. 10 shows, as a function of time, a speed error along axis Xb achieved by simulating an integration by pure inertia of the type from prior art that does not effect a correction, where the studied system is that of FIG. 3, FIG. 11 shows, as a function of time, a position error along axis Xb, achieved by simulating an integration by pure inertia of the type from prior art effecting a pure inertia correction, but based on the assumption that the altitude of the carrier does not vary a lot from a setpoint, where the studied system is that of FIG. 3, FIG. 12 shows, as a function of time, an altitude error along axis Zb achieved by simulating an integration by pure inertia of the type from prior art effecting a pure inertia correction, but based on the assumption that the altitude of the carrier does not vary a lot from a setpoint, where the studied system is that of FIG. 3, FIG. 13 shows, as a function of time, a speed error along axis Xb achieved by simulating an integration by pure inertia of the type from prior art effecting a pure inertia correction, but based on the assumption that the altitude of the carrier does not vary a lot from a setpoint, where the studied system is that of FIG. 3, FIG. 14 shows, as a function of time, a speed error along axis Zb achieved by simulating an integration by pure inertia of the type from prior art effecting a pure inertia correction, but based on the assumption that the altitude of the carrier does not vary a lot from a setpoint, where the studied system is that of FIG. 3, FIG. 15 shows, as a function of time, an accelerometer bias error Z achieved by simulating an integration by pure inertia of the type from prior art effecting a pure inertia correction, but based on the assumption that the altitude of the carrier does not vary a lot from a setpoint, where the studied system is that of FIG. 3, FIG. 16 shows, as a function of time, a bias error along axis Xb achieved by simulating an integration by pure inertia of the type from prior art effecting a pure inertia correction, but based on the assumption that the altitude of the carrier does not vary a lot from a setpoint, where the studied system is that of FIG. 3, FIG. 17 shows, as a function of time, a position error along axis Xb achieved by simulating an integration by pure inertia according to the invention, where the studied system is that of FIG. 3, FIG. 18 shows, au a function of time, an altitude error along axis Zb achieved by simulating an integration by pure inertia according to the invention, where the studied system is that of FIG. 3, FIG. 19 shows, as a function of time, an error in an angle (α) achieved by simulating an integration by pure inertia according to the invention, where the studied system is that of FIG. 3, FIG. 20 shows, as a function of time, a speed error along axis Xb achieved by simulating an integration by pure inertia according to the invention, where the studied system is that of FIG. 3, FIG. 21 shows, as a function of time, a speed error along axis Zb achieved by simulating an integration by pure inertia according to the invention, where the studied system is that of FIG. 3, FIG. 22 shows, as a function of time, an error of movement along axis Zb achieved by simulating an integration by pure inertia according to the invention, where the studied system is that of FIG. 3, FIG. 23 shows, as a function of time, an accelerometer bias error (Z) achieved by simulating an integration by pure inertia according to the invention, where the studied system is that of FIG. 3, FIG. 24 shows, as a function of time, an accelerometer bias error (X) achieved by simulating an integration by pure inertia according to the invention, where the studied system is that of FIG. 3.

One method of implementation of the invention applied, as a non-limiting illustration, to a terrestrial vehicle, will now be described.

Quite obviously, this present invention is in no way limited to such a vehicle.

It will be noted, in this regard, according to the kinematic behaviour patterns of the carrier, that the movement components employed by the kinematic model can be very different from those presented here.

FIRST EXAMPLE

In a first example, we have represented, as a non-limiting example, a carrier 1 in FIG. 1, or more precisely in this example, a vehicle 1 which is moving straight ahead on a horizontal road.

The vehicle 1 is equipped with an inertial navigation system according to this present invention, that is capable of measuring movements in terms of modelizable kinematic components.

In the case of such a vehicle, it is advantageous to associate the kinematic components with the axes of movement of this vehicle.

In this regard, FIG. 1 shows three axes of movement X, Y, Z with axis X being parallel to the direction of travel and the other two axes (Y and Z transverse or substantially transverse to axis X.

It will be noted here that the three do not necessarily form an orthonormal trihedron.

In order to precisely determine the movement along axis X, this present invention dispenses with the use of external data such as that which could be obtained from an odometer in the case of a wheeled vehicle.

According to this present invention, the additional data is determined by a kinematic model which, on the basis of inertial measurements along axes Y and Z, can be used to determine, with very little error (in relation to determination by pure inertia), the movements along axis X.

In this regard, the kinematic model does not choose the Y and Z axes by chance.

They have been chosen so that if inertial measurements were performed along their respective directions, we would ideally obtain a result that is already known to the kinematic model once these measurements have been integrated.

For example, when the vehicle moves essentially in a straight line, that is in a direction parallel to X, the model arranges that the inertial measurements of the movements along axes Y and Z must be zero.

In fact, over a particular portion of the trajectory, typically the portion marked 4 to 5 where the vehicle does not change direction, the vehicle 1 in particular executes movements of its body which indicate real-time movements along axes Y and Z, but in the time necessary to cover the said portion of trajectory 4 to 5, these movements are zero on average, since the vehicle always returns to a position of equilibrium along both Y and Z.

Naturally however, this does not apply when the period between two observations of the vehicle movements 1 is such that the latter has had the time to change direction by turning right or left, for example, since the prediction of the model according to which the measurements along Y are zero (in particular the measurements of acceleration and speed along this axis) is no longer accurate when turning.

In this case, the invention proposes to add complexity to the kinematic model for example.

The model, which is constantly analysing the measurements relating to the behaviour of the vehicle, is informed by the latter on the turning conditions (in particular by analysing the rotation measurements of the vehicle by means of a gyrometer, for example) and adapts its predictions of movement along the chosen axes in order to cause convergence of the system toward this prediction, and in order to optimally deduce the movements according to the components sought in three-dimensional space.

For example, the model can determine that, according to the most recent rotation measurements, the speed of movement predicted, and toward which the system must converge, is equal to a precise non-zero value along the Y axis chosen during this turning step.

Attention is drawn here to the fact that the inertial measurements and the choice of the axes to be considered by the model take place frequently over time.

Such an update frequency allows a finer determination of the movements of the carrier, since it can be used to study them all along the trajectory.

Referring now to FIG. 2, we will describe, more precisely, the operation of the system of the invention.

According to the conditions of movement (straight line, turning, climbing, etc.) measured at a previous instant, the kinematic model makes a choice regarding the movement components of the carrier to be analysed.

Once these components have been chosen, inertial measurements 20 along these components are performed by means of inertial sensors 10, such as gyroscopes/gyrometers and/or accelerometers in particular, positioned judiciously on the carrier 1.

Returning to the example of the vehicle, the inertial measurements 20 are performed along axes Y and/or Z since, in the case of a straight line as represented in FIG. 1, the model predicts a zero movement value on these axes.

It will be noted here that the method according to the invention also provides for the possibility of controlling/ monitoring the position and the orientation of these sensors 10 in order to increase independence in relation to any future changes.

These inertial measurements 20 are then integrated 11 in order to determine, in block 13 which will be described later in the text, the inertial attitude, speed and position data.

In the case where it is possible to apply zero-speed hybridisation 16, that is where halting of the vehicle is rendered possible (typically a natural stop), these measurements 20 are used to analysis 15 the movements of the vehicle 1 in order to detect the stops, and therefore to estimate the errors, typically drift or bias in particular, along the main axis in direction X.

But, quite obviously, as is the intention of the invention, these stops are not obligatory in any way.

Once the integration 11 of the inertial measurements 20 has been performed, we use a state model or form 12 which allows us to estimate the values of parameters in a matrix (X).

The state model is based typically on an equation of the following form;

$$\frac{dX}{dt} = f(X, t) \text{ or } \frac{dX}{dt} = F \cdot X \quad (1)$$

where f is a non-linear function and F(t) is its linearized state matrix, X is a state vector, and t is time.

According to a preferred aspect of the invention, use will be made of a Kalman filter, but quite obviously, other types of filter already known to the professional engineer can be used, depending on the cases concerned.

Regarding the design of such a Kalman filter, there are many documents to which one can refer, including "Applied Optimal Estimation" [1] for example.

It will also be noted that among the parameters of matrix X are the parameters for speed, acceleration, angle of rotation or attitude.

In addition, according to another aspect of the invention, it is arranged that the kinematic model 13 should be configurable (through variable parameters), with the result that matrix X can also contain parameters of this model 13.

The estimated values 21 of the parameters of matrix X are supplied simultaneously, firstly to block 14, and secondly to the kinematic model 13 of the vehicle 1.

The kinematic model 13 includes all the useful kinematic properties of the vehicle 1 and can be used in particular to connect the movements estimated 21 along the said chosen components to the movement along a sought component (along axis X for example).

In addition, from these estimates 21, the model supplied the said predicted values 23 to block 14.

For example, as mentioned above, in the case of the vehicle moving straight ahead, the estimate of the speed along movement component Y must be substantially zero.

Following analysis of the estimates 21, the kinematic model 13 deduces that the vehicle is indeed moving straight ahead and then supplies the said predicted zero value 23 to block 14.

It will also be noted that the kinematic model 13 also supplies the values of the parameters determined during the previous iteration, from the integration 11 and from the state model 12.

Quite obviously, and also as mentioned above, in the case of a turning movement, the kinematic model 13, knowing the behaviour of the vehicle when turning, uses the estimates 21 (such as the estimates obtained from the measurements of a gyroscope or gyrometer for example) to supply a predicted value 23 to suit this new situation.

Then block 14 determines a difference between an estimated value and the predicted value 23 supplied by the kinematic model 13, with the predicted value 23 concerning the same parameter as the value of the estimate in question.

In our example, block 14 in particular compares the estimate of the speed along Y to the said predicted value 23 of speed along Y.

The result I of this comparison (I is therefore an error matrix, usually referred to as an innovation matrix) is supplied to block 22 in order to correct parameters of the state model 12 (estimate of the bias, drift, etc.) by means of a loop.

For example, the inertial error observed on the speed along Y in block 14 is used to correct parameters of the state model 12 and to correct the errors on the estimate of the speed along Y in parallel with the loop iterations.

In addition, as represented by arrow 24, correction of the parameters of the state model 12 also allows correction of the errors in the measurements 20 integrated initially, thus further improving the said correction of the errors in estimate (in the example considered here, regarding estimation of the speed along Y in particular).

The steps just described, and which bring into play blocks 11, 12, 13, 14 and 17, are therefore implemented repeatedly in a loop in order to constantly reduce the inertia errors, thereby improving the estimates of position, speed and attitude.

It will also be noted that the frequency of the corrections is preferably less than that of the measurements 20 obtained from the inertial sensors 10.

Finally, as represented in FIG. 2, the last estimates of the inertial navigation parameters of the carrier can be supplied 18 to a user by means of a display screen for example.

These estimates can also be supplied to another system if the latter can use them.

As mentioned previously, the navigation system according to this present invention can advantageously be complemented by other known systems.

It is possible, for example, to add a zero-speed hybridisation system, where the latter is called upon only in the case where the external conditions so allow (a natural stop, etc.).

In this regard, FIG. 2 illustrates such a possibility with dotted arrows.

The block 16 which corresponds to the use of a zero-speed hybridisation is run in parallel with the block of the kinematic model 13 of the invention, with the estimates 21 being supplied to blocks 13 and 16 in this case.

It can be seen from this fact that the dimension of matrix H has therefore increased.

SECOND EXAMPLE

A second non-limiting example, used to illustrate the invention, is described below, with reference to FIGS. 3 to 24.

FIG. 3 now illustrates the vehicle 1 as it climbs in a straight line on a road 2.

The road 2 on longitudinal axis Xr and vertical axis Zr is thus inclined at an angle β in relation to horizontal axis Xh (FIG. 3).

Moreover, the axes of the vehicle Xb and Zb form an angle α with the axes of the road Xr and Zr respectively.

Since the axes associated with the unit can differ from those of the vehicle 1, namely Xb and Yb, the unit is harmonised with the axes of the latter.

It will be seen that the angle α forms part of the state variables estimated by the Kalman filter.

It will also be seen that each coordinate system has a third axis Yb, Yr arranged so as to obtain orthonormal coordinate systems.

In this regard, inertial measurements can be performed in particular on axis Yb.

In this non-limiting example, the kinematic model arranges that the movement along axis Zr is zero (another non-limiting example would have been to consider a non-zero movement along axis Yb or Yr).

According to the invention, an observation is then performed on axis Zr from angle $\alpha$, as well as a measurement of movement along axis Zb.

Then an innovation I is determined, in order to correct the parameters of the system, by comparing the said observation with the zero value predicted by the kinematic model.

As an illustration, equations are provided below representing modeling of the simplified system concerned, assuming that the ground is flat.

let Vxb, Vzb be the speed of the vehicle 1 along axis Xb and Zb respectively, let xx, zz be the position of the vehicle 1 along axis Xb and Zb respectively, let $\phi y$ be the vertical error along Yb, let Dy be the drift of a gyroscope along axis Yr, let bx be the accelerometer bias on x let bz be the accelerometer bias on z let $\alpha$ be the angle $\alpha$, let depZ be the movements along axis Zr, and let g be a model of gravity.

By reasoning regarding the errors to be linearized around the optimal solution, the Kalman filter can, in particular, take the form presented below (it will be seen that the symbol $\delta$ indicates a calculation error):

$\delta\dot\phi y = \delta Dy$, $\delta\dot Vxb = g \times \delta\phi y + \delta bx$, $\delta\dot xx = \delta Vxb$, $\delta\dot zz = \delta Vzb + Vxb \times \delta\phi y + \delta Vxb \times \phi y$, $\delta\dot Vzb = \delta bz$, $\delta d\dot epZ = \delta Vzb + Vxb \times \delta\alpha + \delta Vxb \times \alpha$, $\delta\dot bx = 0$, $\delta\dot bz = 0$, $\delta\dot Dy = 0$, $\delta\dot\alpha = 0$ We thus obtain the following state matrix F:

$F(\delta\phi y, \delta dy) = 1$, $F(\delta Vxb, \delta\phi y) = g$, $F(\delta Vxb, \delta bx) = 1$ $F(\delta xx, \delta Vxb) = 1$ $F(\delta zz, \delta Vzb) = 1$, $F(\delta zz, \delta\phi y) = Vxb$, $F(\delta zz, \delta Vxb) = \phi y$, $F(\delta Vzb, \delta bz) = 1$ $F(\delta depZ, \delta Vzb) = 1$, $F(\delta depZ, \delta\alpha) = Vxb$, $F(\delta depZ, \delta Vxb) = \alpha$ The observation of the Kalman filter is directly the movement along axis Zr, namely:

$H(\delta depZ) = 1$

Where H is an observation matrix

The said innovation I is calculated as follows:

$I = 0 - depZ$, given that depZ is the integral of the projection of the estimated speeds of the carrier on the vertical of the road estimated by the angle $\alpha$, so that:

$depZ = \int_o^t (Vzb^* \cos(\alpha) + Vxb^* \sin(\alpha)) dt$

We now present some simulation results that allow comparison of the performance of the system as proposed by the invention and of systems of prior art.

It will be noted to begin with that the following results were obtained by considering that the ground was flat, so as to simplify the calculations, and by performing the following settings:

Trajectory

Speed of the carrier along axis Xr=20 m/s, $\alpha$=34 mrad, $\beta$=17 mrad,

Errors of the Simulated Unit (in the Example)

Dy=0.01°/h

Bx=10 µg bz=50 µg

The simulation results are presented in FIGS. 4 to 24 and divided into three groups.

A first group (FIGS. 4-10) concerns results that it is possible to obtain with a system by pure inertia, of prior art, and which does not apply correction of the inertia errors.

A second group (FIGS. 11-16) concerns results that can be obtained with a hybridisation system of prior art, used generally, which implements a correction of the inertia errors and which is based on the assumption that the altitude of the vehicle varies very little around a setpoint.

A third group (FIGS. 17-24) concerns results that are obtained with the hybridisation system as proposed in this example of the invention.

On each of FIGS. 4-24, the symmetrical dotted curves represent the 3σ covariances of the magnitude illustrated.

For example, in FIG. 5, curve 50 corresponds to the integration error in the altitude along axis Zb, while curves 51 and 52 represent the 3σ covariances of this error in the filter.

Referring firstly to the first group of figures, in particular to FIG. 10 representing an accelerometer bias Z as a function of time, it is possible to observe the absence of correction in particular by the fact that covariance curves 51, 52 do not approach each other.

By contrast, in the second and third groups, in particular FIGS. 15 and 23, each representing the accelerometer bias Z as a function of time, it is possible to observe the effect of the correction in particular by the convergence of the covariance curves.

Without analysing each of FIGS. 4 to 24 in detail, it is possible to observe quite simply and in general that the best results are obtained with the hybridisation according to the invention.

In particular, with the invention, an altitude error of 15 meters is obtained after 30 minutes of navigation (FIG. 18), against more than 750 meters with hybridisation of the type from prior art that does not effect a correction (FIG. 5).

Regarding hybridisation of the type from prior art based on the assumption that the altitude remains constant (group 2), it is possible to observe from FIG. 12 that the curve relating to error in altitude 120 diverges and, at point A, crosses the top covariance curve 121 (in FIG. 12), which shows that using hybridisation of this type can give rise to risks of divergence in the case of the example considered here.

This is due to the fact that the altitude is considered to be constant while the vehicle is climbing up the road 2, and so the assumption is therefore wrong.

By now comparing FIGS. 4, 11 and 17, it is possible to observe that the error in position along axis Xb is advantageously less in the case of hybridisation according to the invention.

By way of an example, at t=1800s, curves 40 and 110 reach about 750 meters, while curve 170, relating to the invention, reaches about 500 meters.

Such a difference illustrates the advantage, in accordance with the invention, of using the kinematic model 13 which, from inertial measurements along a chosen axis, helps to some extent in determining the movements along another axis in particular.

According to a variant of the method of implementation presented in this second example, it is; possible to further improve the performance of the navigation system by still further increasing the complexity of the kinematic model.

For example, angle α can be modeled by taking account of at least one parameter determining an operational state of the vehicle (in particular taking account of its acceleration along axis Xr) and/or taking account of at least one technical characteristic of this vehicle (the position of its centre of gravity in particular, in relation to the position of the unit, or indeed the stiffness of the vehicle).

In this regard, a preferred model of the invention has angle α can expressed in the following form:

$$\alpha = \alpha_o + k^* y_{xr}$$

where parameters $\alpha_o$, k and $y_{xr}$ correspond respectively to a constant component, a proportionality factor reflecting the stiffness of the vehicle, and the acceleration of the latter measured along axis Xr.

According to the invention, parameters $\alpha_o$ and k can be estimated, in particular by the Kalman filter.

In addition, in order to improve the performance of the navigation system in conditions where the vehicle is moving, it is possible, according to another aspect of the invention, applied for example to this second example, to consider that, in the aforementioned conditions, axis Zr, along which it will be recalled that the movements are assumed to be zero, changes position in space, in particular as a function of the kinematics of the vehicle.

It is possible to add complexity in this way to the model of the invention, by modeling this position according to the real-time conditions of movement, in particular at one or more angular velocities (speed of rotation in line, for example).

The position of axis Zr is modeled, for example, by distance coordinates along axes Xr and Yr, respectively.

Advantageously, these coordinates are estimated by the Kalman filter and correspond quite obviously to the position of axis Zr along which the movements of the vehicle are zero.

Naturally however, this present invention is in no way limited to the form of implementation described above and represented in the figures.

In fact, a large number of variants can deviate from the general concept of this present invention.

This is the case in particular concerning the movement components considered by the kinematic model 13, since these depend in particular on the type of carrier and its modelizable kinematic behaviour patterns.

Thus, a variant of the invention consists of using angular components of kinematic movement.

This can apply for example to a system which mounted on an observation device which has a constant speed of rotation in line (such as a radar set, a satellite, etc).

In addition, the professional engineer will understand that the number of axes to be chosen in order to deduce data on another axis will depend on the case to which the invention applies.

In this regard, it is recalled that, according to the method of the invention, in the light of the kinematic model of the carrier, one chooses at least one movement component according to which the integration of the inertial measurements is assumed to give a predetermined value.

One component can therefore suffice in order to improve the performance of a system operating by pure inertia.

Nevertheless, it goes without saying that the greater the variety of external data, the more the performance of the system should improve.

Thus, the use of two movement components, or even more, (linear or angular or a combination) can only be advantageous to the system of the invention.

Finally, other variants of the invention also concern the nature of the parameters on which the method of the invention, described in FIG. 2, performs corrections.

By way of an example, the method can model a movement component and/or a speed component and/or an acceleration component.

BIBLIOGRAPHICAL REFERENCES

[1] Applied Optimal Estimation, The Analytic Sciences Corporation, Ed. Arthur Gelb, 1974.
[2] The Aiding of a Low-Cost Strapdown Inertial Measurement Unit Using Vehicle Model Constraints for Land Vehicle Applications, Gamini Dissanayake, IEEE Transactions on Robotics and Automation, Vol. 17, No 5, October 2001.

The invention claimed is:

1. A method intended to determine the inertial navigation parameters (18) of a carrier (1) moving along with modelizable kinematic movement components and comprising an inertial navigation system without motion external information, in which the inertial navigation system performs the steps consisting of:
(a) providing inertial measurements (20), which can include an error, known as the inertia error, which results in determining these parameters inaccurately (18),
(b) choosing, by the inertial navigation system, on a kinematic model (13) of the carrier (1), at least one movement component according to which the integration (11) of the inertial measurements (20) is assumed to give a predetermined value,
(c) integrating (11) measurements (20) according to the chosen component or components,
(d) determining (14), according to these components, a difference between the integration (11) obtained at step (c) and the predetermined value from step (b),
(e) estimating, as a function of the difference or differences thus obtained, an overall inertia error resulting from the inertia errors associated with the said modelizable components, and the values of the variable parameters of the kinematic model that are to be updated (13), and (f) correcting said inertial navigation parameters as a function of the overall inertia error thus determined.

2. A method according to claim 1, characterised in that the estimates in step (e) are made by means of a filter.

3. A method according to claim 2, characterised in that the filter is a Kalman filter.

4. A method according to claim 1, characterised in that one of the variable parameters of the kinematic model is an angle α between at least one axis (Xb) of the carrier and an axis (Xr) of a road traveled by this carrier.

5. A method according to claim 4, characterised in that the angle α is modeled as a function of at least one parameter reflecting an operational state of the carrier.

6. A method according to claim 4, characterized in that one of the variable parameters of the kinematic model is a distance coordinate between the axis of the road and of the carrier.

7. An inertial navigation system without motion external information, mounted in a carrier (1) moving along with modelizable kinematic movement components, and that includes:

inertial measurement means for obtaining inertial measurements, means designed to choose, on a kinematic model (13) of the carrier, at least one movement component according to which integration of the inertial measurements is assumed to give a predetermined value, means designed to integrate measurements according to the chosen component or components, means designed to determine, in accordance with said components, a difference between the integration and the predetermined value, means designed to estimate, as a function of the difference or differences thus obtained, an overall inertia error resulting from the inertia errors associated with said modelizable components, means designed to correct said inertial navigation measurements as a function of the overall inertia error determined, and means designed to estimate, in accordance with the said difference, values of the variable parameters of the kinematic model that are to be updated (13).

8. A system according to claim 7, characterised in that it also includes means designed to implement the method according to any of claims 2 to 6.

9. A method according to claim 5, characterized in that one of the variable parameters of the kinematic model is a distance coordinate between the axis of the road and of the carrier.

\* \* \* \* \*